(12) United States Patent
Peng et al.

(10) Patent No.: US 12,204,089 B2
(45) Date of Patent: Jan. 21, 2025

(54) EYEPIECE OPTICAL STRUCTURE, EYEPIECE SYSTEM AND OPTICAL DEVICE

(71) Applicant: Shenzhen NED Optics Co., Ltd, Shenzhen (CN)

(72) Inventors: Huajun Peng, Shenzhen (CN); Hongpeng Cao, Shenzhen (CN); Jianfei Guo, Shenzhen (CN)

(73) Assignee: Shenzhen NED Optics Co., Ltd, Shenzhen (CN)

( * ) Notice: Subject to any disclaimer, the term of this patent is extended or adjusted under 35 U.S.C. 154(b) by 0 days.

(21) Appl. No.: 18/153,063

(22) Filed: Jan. 11, 2023

(65) Prior Publication Data
US 2023/0244073 A1 Aug. 3, 2023

(30) Foreign Application Priority Data
Jan. 12, 2022 (CN) .......................... 202210029486.6

(51) Int. Cl.
*G02B 25/00* (2006.01)
(52) U.S. Cl.
CPC ................................. *G02B 25/001* (2013.01)
(58) Field of Classification Search
CPC .................................................. G02B 25/001
USPC ........................................................ 359/643
See application file for complete search history.

(56) References Cited

U.S. PATENT DOCUMENTS

2021/0157122 A1* 5/2021 Cao ..................... G02B 27/0172

FOREIGN PATENT DOCUMENTS

| CN | 106019567 A | 10/2016 |
| CN | 110824712 A | 2/2020 |
| CN | 112303584 A | 2/2021 |
| WO | WO2017219433 A1 | 12/2017 |

* cited by examiner

*Primary Examiner* — William Choi
(74) *Attorney, Agent, or Firm* — Nitin Kaushik

(57) ABSTRACT

The present invention relates to an eyepiece optical structure, an eyepiece system and an optical device. The structure includes a lens group T1 on which an optical binary surface pattern and a Fresnel surface pattern distributed in a direction from a human eye viewing side to a display device side are arranged. The lens group T1 has a focal length of F, and a clear aperture of D, and F and D satisfy the following relational expression: $1.9 \leq F/D$. The optical binary surface pattern has a focal length of F2, and F and F2 satisfy the following relational expression: $-120 < F2/F < 10.78$. In the present invention, a combination of the novel optical surface pattern and the Fresnel surface pattern is adopted, and the focal length of each lens and lens group achieves great elimination of system aberration under the condition of meeting specific conditions.

13 Claims, 24 Drawing Sheets

EYEPIECE OPTICAL STRUCTURE, EYEPIECE SYSTEM AND OPTICAL DEVICE

CROSS-REFERENCE TO RELATED APPLICATIONS

The application claims priority to Chinese patent application No. 202210029486.6, filed on Jan. 12, 2022, the entire contents of which are incorporated herein by reference.

TECHNICAL FIELD

The present invention relates to the technical field of optical systems of head-mounted display devices, and more particularly to an eyepiece optical structure, an eyepiece system and an optical device.

BACKGROUND

With the continuous development of electronic devices to ultra-miniaturization, and the development of new computers, microelectronics, optoelectronic devices and communication theories and technologies, wearable computing, a novel model based on "people-oriented" and "man-machine integration", has become possible. Applications are constantly emerging in military, industrial, medical, educational, consumption and the like fields. In a typical wearable computing architecture, a head-mounted display device is a key component. The head-mounted display device directs the video image light emitted from a miniature image displayer (e.g., a transmissive or reflective liquid crystal displayer, an organic electroluminescent element, or a DMD element) to the pupil of the user by optical technology to implement virtual magnified images in the near-eye range of the user, so as to provide the user with intuitive, visual images, video, text information. The eyepiece optical system is the core of the head-mounted display device, which realizes the function of displaying a miniature image in front of human eyes to form a virtual magnified image.

The head-mounted display device develops in the direction of compact size, light weight, convenient wearing, and load reduction. Meanwhile, a large field-of-view angle and visual comfort experience have gradually become key factors to evaluate the quality of the head-mounted display device. The large field-of-view angle determines a visual experience effect of high liveness, and high image quality and low distortion determine the comfort of visual experience. To meet these requirements, the optical system should try its best to achieve such indexes as a large field-of-view angle, high image resolution, low distortion, small field curvature, and a small volume. It is a great challenge for system design and aberration optimization to satisfy the above optical properties at the same time.

SUMMARY

A technical problem to be solved by the present invention is to provide an eyepiece optical structure, an eyepiece system and an optical device, aiming at the aforementioned defects of the prior art.

The technical solution adopted by the present invention to solve the technical problem thereof is as follows.

An eyepiece optical structure is constructed, which includes a lens group T1 on which an optical binary surface pattern and a Fresnel surface pattern distributed in a direction from a human eye viewing side to a display device side are arranged;

wherein the lens group T1 has a focal length of F and a clear aperture of D, and F and D satisfy the following relational expression: $1.9 \leq F/D$;

the optical binary surface pattern has a focal length of F2 and a radius value of R2; F and F2 satisfy the following relational expression: $-120 < F2/F < 10.78$; and F2 and R2 satisfy the following relational expression: $0.5 \leq F2/R2 \leq 14.50$;

the Fresnel surface pattern has a focal length of F3 and a radius value of R3, and F3 and R3 satisfy the following relational expression:

$-1.88 \leq F3/R3 \leq -0.010$;

the lens group T1 is composed of a first lens; and in the direction from the human eye viewing side to the display device side, the surfaces at two sides of the first lens are respectively provided with the optical binary surface pattern and the Fresnel surface pattern.

In the eyepiece optical structure of the present invention, the optical binary surface pattern of the first lens uses an aspheric surface as a base; and the Fresnel surface pattern of the first lens uses a flat surface as a base.

An eyepiece optical structure is provided, which includes a lens group T1 on which an optical binary surface pattern and a Fresnel surface pattern distributed in a direction from a human eye viewing side to a display device side are arranged;

wherein the lens group T1 has a focal length of F and a clear aperture of D, and F and D satisfy the following relational expression: $1.9 \leq F/D$;

the optical binary surface pattern has a focal length of F2 and a radius value of R2; F and F2 satisfy the following relational expression: $-120 < F2/F < 10.78$; and F2 and R2 satisfy the following relational expression: $0.5 \leq F2/R2 \leq 14.50$;

the Fresnel surface pattern has a focal length of F3 and a radius value of R3, and F3 and R3 satisfy the following relational expression:

$-1.88 \leq F3/R3 \leq -0.010$;

the lens group T1 is composed of two lenses, including a first lens and a second lens located at the front end of the first lens; and in the direction from the human eye viewing side to the display device side, the surfaces at two sides of the first lens are respectively provided with the optical binary surface pattern and the Fresnel surface pattern;

the second lens is a traditional even aspheric positive lens; and in the direction from the human eye viewing side to the display device side, the surfaces at two sides of the second lens are respectively provided with an even aspheric surface and an optical spherical surface.

In the eyepiece optical structure of the present invention, the optical binary surface pattern of the first lens uses an aspheric surface as a base; and the Fresnel surface pattern of the first lens uses an aspherical surface as a base.

An eyepiece optical structure is provided, which includes a lens group T1 on which an optical binary surface pattern and a Fresnel surface pattern distributed in a direction from a human eye viewing side to a display device side are arranged;

wherein the lens group T1 has a focal length of F and a clear aperture of D, and F and D satisfy the following relational expression: $1.9 \leq F/D$;

the optical binary surface pattern has a focal length of F2 and a radius value of R2; F and F2 satisfy the following relational expression: −120<F2/F<10.78; and F2 and R2 satisfy the following relational expression: 0.5≤F2/R2≤14.50;

the Fresnel surface pattern has a focal length of F3 and a radius value of R3, and F3 and R3 satisfy the following relational expression:

$-1.88 \leq F3/R3 \leq -0.010;$ the lens group T1 is composed of three lenses, including a first lens and a second lens located at the front end of the first lens, wherein the second lens is a traditional even aspherical positive lens; and in the direction from the human eye viewing side to the display device side, the surfaces at two sides of the second lens are respectively provided with an even aspheric surface and an optical spherical surface;

a third lens is arranged downstream of the first lens, and the third lens is a traditional spherical lens; and both surfaces at two sides of the third lens are provided with optical spherical surfaces.

In the eyepiece optical structure of the present invention, the optical binary surface pattern of the first lens uses an aspheric surface as a base; and the Fresnel surface pattern of the first lens uses a flat surface as a base.

An eyepiece optical structure is provided, which includes a lens group T1 on which an optical binary surface pattern and a Fresnel surface pattern distributed in a direction from a human eye viewing side to a display device side are arranged;

wherein the lens group T1 has a focal length of F and a clear aperture of D, and F and D satisfy the following relational expression: 1.9≤F/D;

the optical binary surface pattern has a focal length of F2 and a radius value of R2; F and F2 satisfy the following relational expression: −120<F2/F<10.78; and F2 and R2 satisfy the following relational expression: 0.5≤F2/R2≤14.50;

the Fresnel surface pattern has a focal length of F3 and a radius value of R3, and F3 and R3 satisfy the following relational expression:

$-1.88 \leq F3/R3 \leq -0.010;$ the lens group T1 is composed of a combination of a fourth lens, a fifth lens, a sixth lens and a seventh lens which are sequentially arranged in the direction from the human eye viewing side to the display device side, and any one of first, second and third schemes is adopted:

first scheme:
the fourth lens is a traditional even aspheric positive lens; the fifth lens is a binary surface lens using an aspheric surface as a base; the sixth lens is a Fresnel lens using a flat surface as a base; and the seventh lens is a traditional spherical lens;

second scheme:
in the direction from the human eye viewing side to the display device side, the surfaces at two sides of the fourth lens are respectively provided with an even aspheric surface and an optical spherical surface, the surfaces at two sides of the fifth lens are respectively provided with a binary surface pattern and a Fresnel optical surface pattern that each uses an aspheric surface as a base, both surfaces at two sides of the sixth lens are provided with optical spherical surfaces, and both surfaces at two sides of the seventh lens are provided with optical spherical surfaces;

third scheme:
in the direction from the human eye viewing side to the display device side, the surfaces at two sides of the fourth lens are respectively provided with an even aspheric surface and an optical spherical surface, the surfaces at two sides of the fifth lens are respectively provided with a binary surface pattern that uses an aspheric surface as a base and a Fresnel optical surface pattern that uses a spherical surface as a base, both surfaces at two sides of the sixth lens are provided with optical spherical surfaces, and both surfaces at two sides of the seventh lens are provided with optical spherical surfaces.

In the eyepiece optical structure of the present invention, F and F3 satisfy the following relational expression:

$0.70 \leq F3/F.$

In the eyepiece optical structure of the present invention, the Fresnel surface pattern is composed of a combination of Fresnel surfaces with different parameters according to continuous outer diameter values.

In the eyepiece optical structure of the present invention, the base of the optical binary surface pattern is a flat surface, spherical surface or aspherical surface; and the base of the Fresnel surface pattern is a flat surface, spherical surface or aspherical surface.

In the eyepiece optical structure of the present invention, the optical components constituting the lens group T1 are made of an optical glass or plastic material.

An eyepiece system is provided, wherein the eyepiece system is provided with the eyepiece optical structure according to any one of claims 1-11 thereon.

An optical device is provided, wherein the optical device is provided with the eyepiece system according to claim 12 thereon.

The beneficial effects of the present invention are: in the present invention, a combination of the novel optical surface pattern and the Fresnel surface pattern is adopted, and the focal length of each lens and lens group achieves great elimination of system aberration under the condition of meeting specific conditions, thereby reducing the sensitivity of each optical component, facilitating the processing and assembly of the components, especially realizing optical indexes such as a large field angle, low distortion, low color difference, low field curvature, low astigmatism, etc. at the same time. An observer can watch a large full-frame picture with high definition, no distortion and an uniform image quality through the eyepiece optical system of the present invention, thereby achieving a visual experience with high telepresence.

BRIEF DESCRIPTION OF THE DRAWINGS

In order to illustrate the embodiments of the present invention or the technical solutions in the prior art more clearly, the present invention is further illustrated in connection with accompanying drawings and embodiments hereafter. The drawings in the following description are only some embodiments of the present invention. For those of ordinary skills in the art, other drawings may be obtained from these drawings without any creative work.

DETAILED DESCRIPTION OF THE PREFERRED EMBODIMENT

In order to make the objectives, technical solutions and advantages of the embodiments of the present invention clearer, hereafter clear and complete description is made with reference to the technical solutions in the embodiments of the present invention, and the described embodiments are a part rather than all of the embodiments of the present invention. All other embodiments obtained by those of ordinary skills in the art without any creative work based on the embodiments disclosed in the present invention fall within the claimed scope of the present invention.

Example 1

Figure 1:
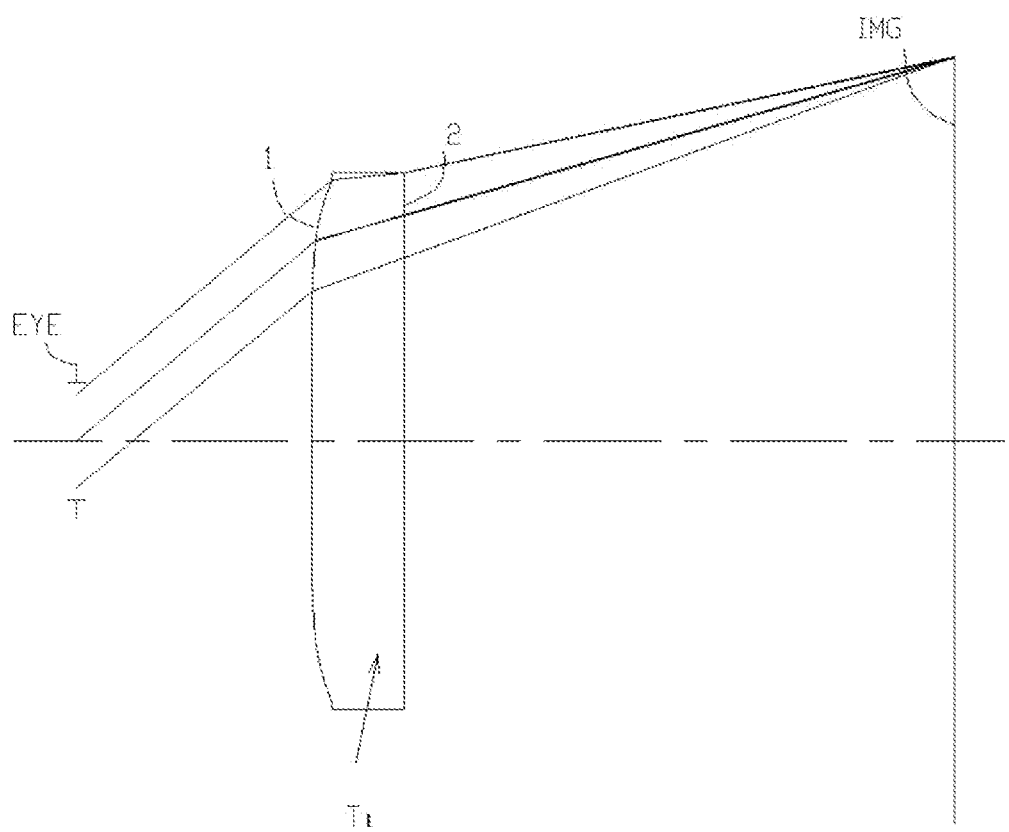
FIG. 1 is a schematic structural diagram of an eyepiece optical system according to Example 1 of the present invention.
Figure 2:
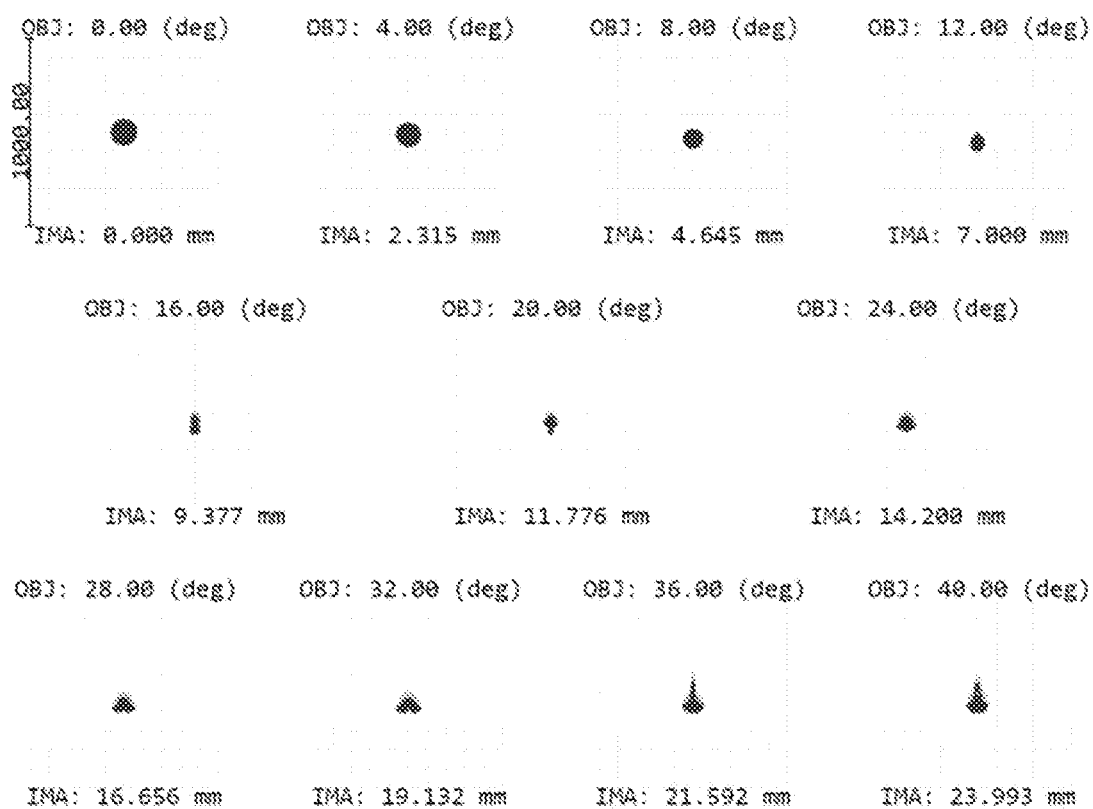
FIG. 2 is a schematic diagram of a dispersed spot array of the eyepiece optical system according to Example 1 of the present invention.
Figure 3:
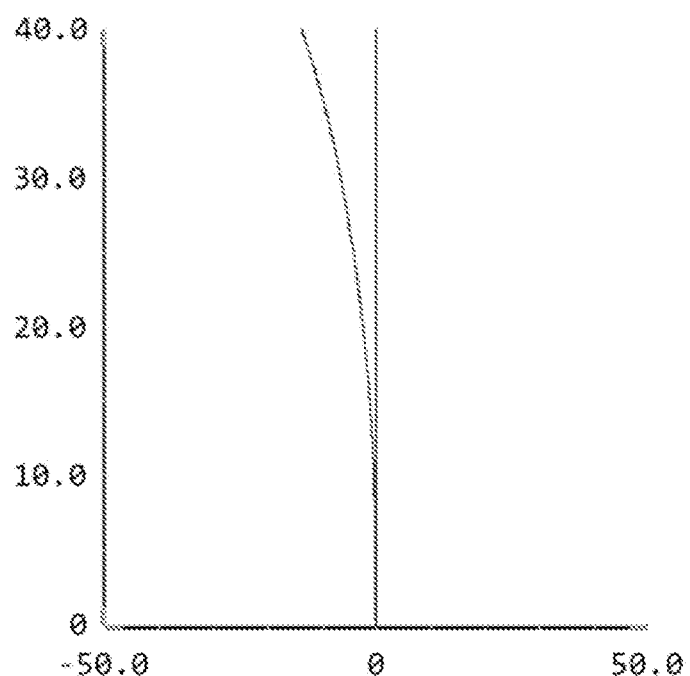
FIG. 3 is a schematic diagram of distortion of the eyepiece optical system according to Example 1 of the present invention.
Figure 4:
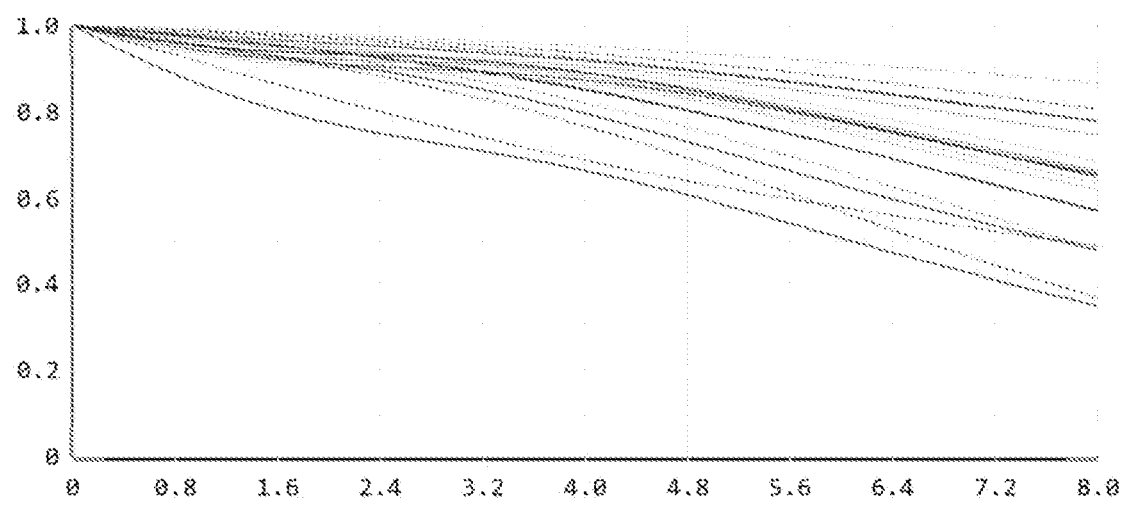
FIG. 4 is a schematic diagram of an optical transfer function MTF of the eyepiece optical system according to Example 1 of the present invention.

The eyepiece optical structure of Example 1 of the present invention is as shown in FIG. 1, and referring to FIGS. 2-4 at the same time, it includes a lens group T1 on which an optical binary surface pattern and a Fresnel surface pattern distributed in a direction from a human eye viewing side to a display device side are arranged.

The lens group T1 has a focal length of F and a clear aperture of D, and F and D satisfy the following relational expression: $1.95 \leq F/D$.

The optical binary surface pattern has a focal length of F2 and a radius value of R2; F and F2 satisfy the following relational expression: $-120 < F2/F < 10.78$; and F2 and R2 satisfy the following relational expression: $0.5 \leq F2/R2 \leq 14.50$.

In the present invention, a combination of the novel optical surface pattern and the Fresnel surface pattern is adopted, and the focal length of each lens and lens group achieves great elimination of system aberration under the condition of meeting specific conditions, thereby reducing the sensitivity of each optical component, facilitating the processing and assembly of the components, especially realizing optical indexes such as a large field angle, low distortion, low color difference, low field curvature, low astigmatism, etc. at the same time. An observer can watch a large full-frame picture with high definition, no distortion and a uniform image quality through the eyepiece optical system of the present invention, thereby achieving a visual experience with high telepresence.

The value of F/D can be 1.95, 2.22.2.56, 2.78, 3.12, 3.55, 4.35, 5.34, etc., F2/F can be −112, −83, −53, −33, −11, −5, 10, etc., and F2/R2 can be 0.5, 1.2, 3.4, 6.1, 8.7, 10.1, 13.2, 14, etc.

Preferably, the Fresnel surface pattern has a focal length of F3 and a radius value of R3, and F3 and R3 satisfy the following relational expression:

$$-1.88 \leq F3/R3 \leq -0.010.$$

F and F3 satisfy the following relational expression:

$$0.70 \leq F3/F.$$

The value of F3/R3 can be −1.87, −1.77, −1.58, −1.43, −1.27, −1.17, etc., and the value of F3/F can be 0.7, 3.12, 6.72, 10.3, 17.4, 33.6, 53.22, etc.

The value of F/D can be 1.95, 2.22.2.56, 2.78, 3.12, 3.55, 4.35, 5.34, etc., F2/F can be −112, −83, −53, −33, −11, −5, 10, etc., and F2/R2 can be 0.5, 1.2, 3.4, 6.1, 8.7, 10.1, 13.2, 14, etc.

Preferably, the Fresnel surface pattern is composed of a combination of Fresnel surfaces with different parameters according to continuous outer diameter values.

Preferably, the base of the optical binary surface pattern is a flat surface, spherical surface or aspherical surface; and the base of the Fresnel surface pattern is a flat surface, spherical surface or aspherical surface.

Preferably, the optical components constituting the lens group T1 are made of an optical glass or plastic material. When the lens group T1 consists of multiple lenses, they can be partially made of an optical glass material and partially made of a plastic material. Simple changes based on this way also belong to the claimed scope of the present application.

Preferably, the lens group T1 includes a first lens; and in the direction from the human eye viewing side to the display device side, the surfaces at two sides of the first lens are respectively provided with the optical binary surface pattern and the Fresnel surface pattern.

Preferably, the optical binary surface pattern of the first lens uses an aspheric surface as a base; and the Fresnel surface pattern of the first lens uses a flat surface as a base.

In this example, the design data is as shown in the table below:

|  |  |  |  | Glass | | | |
| Surface | Surface pattern | Radius | Thickness | Refractive index | Abbe number | Effective aperture | Cone coefficient |
| --- | --- | --- | --- | --- | --- | --- | --- |
| Diaphragm |  | Infinity | 17.5 |  |  | 5 |  |
| 2 | Binary surface | −101.01 | 7.19 | 1.74 | 49.34 | 38.33 | −30.49 |
| 3 | Fresnel surface | −21.71 | 33.87 |  |  | 37.90 | −4.68 |
| Image surface |  | Infinity |  |  |  | 48.16 |  |

FIG. 1 is a 2D structural diagram of the eyepiece optical system of Example 1. The lens group T1 of the optical structure consists of an optical lens, wherein a surface 1 is a binary surface pattern that uses an aspheric surface as a base and a surface 2 is a Fresnel optical surface pattern that uses a flat surface as a base, and the parameters of the binary surface are:

Coefficient on $r^4$: 3.227463e-05

Coefficient on $r^6$: −1.6405878e-08

Coefficient on $r^8$: −1.079648e-11

Coefficient on $r^{10}$: 7.6961223e-14

Normalization Radius: 100

Coefficient on $p^2$: 145767.05

Coefficient on $p^4$: 1852427.8

Coefficient on $p^6$: −17160116

The pattern parameters of the Fresnel surface are:

Coefficient on $r^4$: −2.4723751e-05

Coefficient on $r^6$: 1.2119728e-07

Coefficient on $r^8$: −1.0746182e-10

Coefficient on $r^{10}$: −1.3508534e-13

Coefficient on $r^{12}$: 6.0649764e-16

The optical system has a focal length of F and a clear aperture of D, and F/D is 6.61. A single sided focal length of the binary surface is F2, F2/F is −6.53, the radius value of the binary surface is R2, and F2/R2 is 2.14. The Fresnel surface has a focal length of F3 and a radius value of R3, F3/R3 is −1.35, and F3/F is 0.88.

FIGS. 2, 3, and 4 are respectively diagrams showing the dispersed spot array, distortion, and optical transfer function MTF of the optical system, which reflect that the lights of respective view fields in this example has high resolution and small optical distortion in the unit pixel of the image plane (the display device 1), the resolution per 8 mm per unit period reaches more than 0.35, the aberration of the optical system is well corrected, and a display image of uniformity and high optical performance can be observed through the eyepiece optical system.

Example 2

This example is basically the same as Example 1. It also adopts a form of single lens. The similarities will not be described here anymore, and as shown in FIGS. 5-8, the difference is that:

The eyepiece design data of Example 2 is as shown in the table below:

|  |  |  |  | Glass | | | |
| Surface | Surface pattern | Radius | Thickness | Refractive index | Abbe number | Effective aperture | Cone coefficient |
| --- | --- | --- | --- | --- | --- | --- | --- |
| Diaphragm |  | Infinity | 17.50 |  |  | 7.00 |  |
| 2 | Binary surface | −329.84 | 6.87 | 1.74 | 49.34 | 38.96 | −30.14 |
| 3 | Fresnel surface | −30.37 | 41.00 |  |  | 40.02 | −7.07 |
| Image surface |  | Infinity |  |  |  | 57.42 |  |

Figure 5:
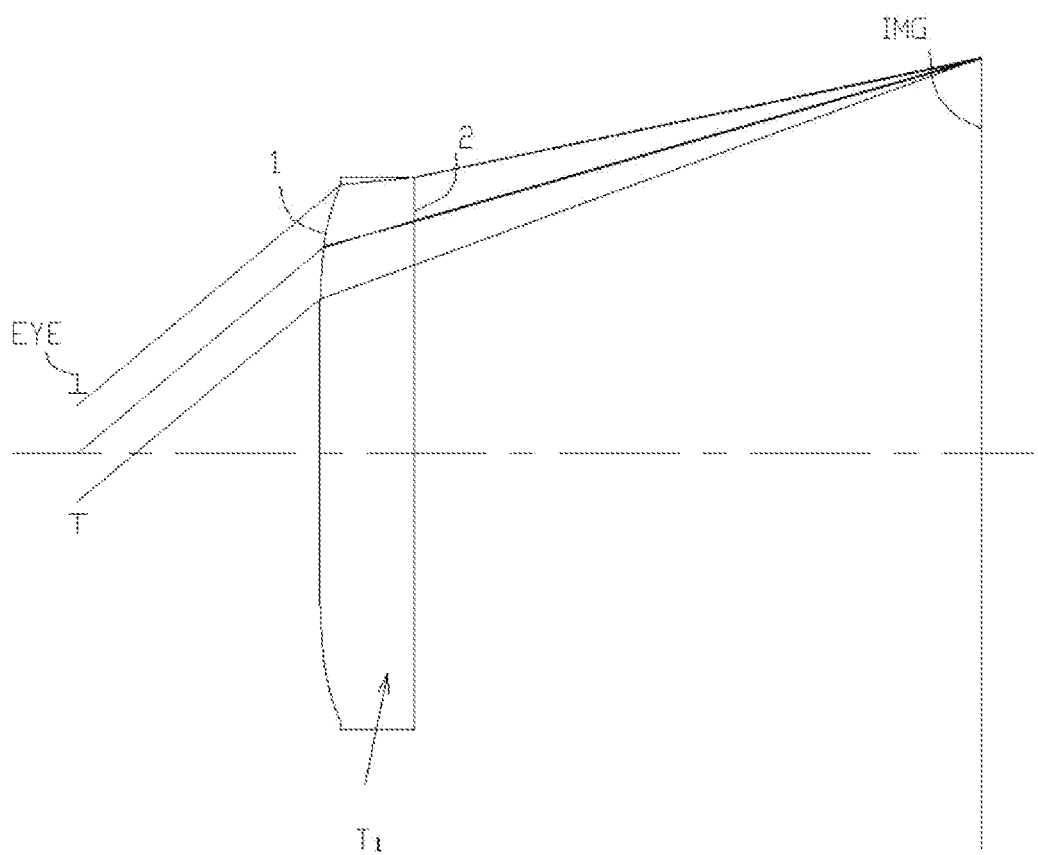
FIG. 5 is a schematic structural diagram of an eyepiece optical system according to Example 2 of the present invention.

FIG. 5 is a 2D structural diagram of the eyepiece optical system of Example 1. The lens group T1 of the optical structure consists of an optical lens, wherein a surface 1 is a binary surface pattern that uses an aspheric surface as a base and a surface 2 is a Fresnel optical surface pattern that uses a flat surface as a base, and the parameters of the binary surface are:
    Coefficient on r^4: 1.1934159e-05
    Coefficient on r^6: 4.04034e-10
    Coefficient on r^8: 1.6292409e-11
    Coefficient on r^10: 4.4224848e-15
    Normalization Radius: 100
    Coefficient on p^2: −109309.22
    Coefficient on p^4: 716953.69
    Coefficient on p^6: −2877521.5
The pattern parameters of the Fresnel surface are:
    Coefficient on r^4: −1.8262798e-05
    Coefficient on r^6: 5.7222084e-08
    Coefficient on r^8: −3.7615818e-11
    Coefficient on r^10: −5.381182e-14
    Coefficient on r^12: 2.1786882e-16

Example 2 is mainly characterized by its higher optical indexes compared with those of Example 1, such as a higher optical transfer function index and better imaging quality compared with those of Example 1. The optical system has a focal length of F and a clear aperture of D, and F/D is 6.61. A single sided focal length of the binary surface is F2, F2/F is −116.1, the radius value of the binary surface is R2, and F2/R2 is 14.49. The Fresnel surface has a focal length of F3 and a radius value of R3, F3/R3 is −1.35, and F3/F is 0.99.

Figure 6:
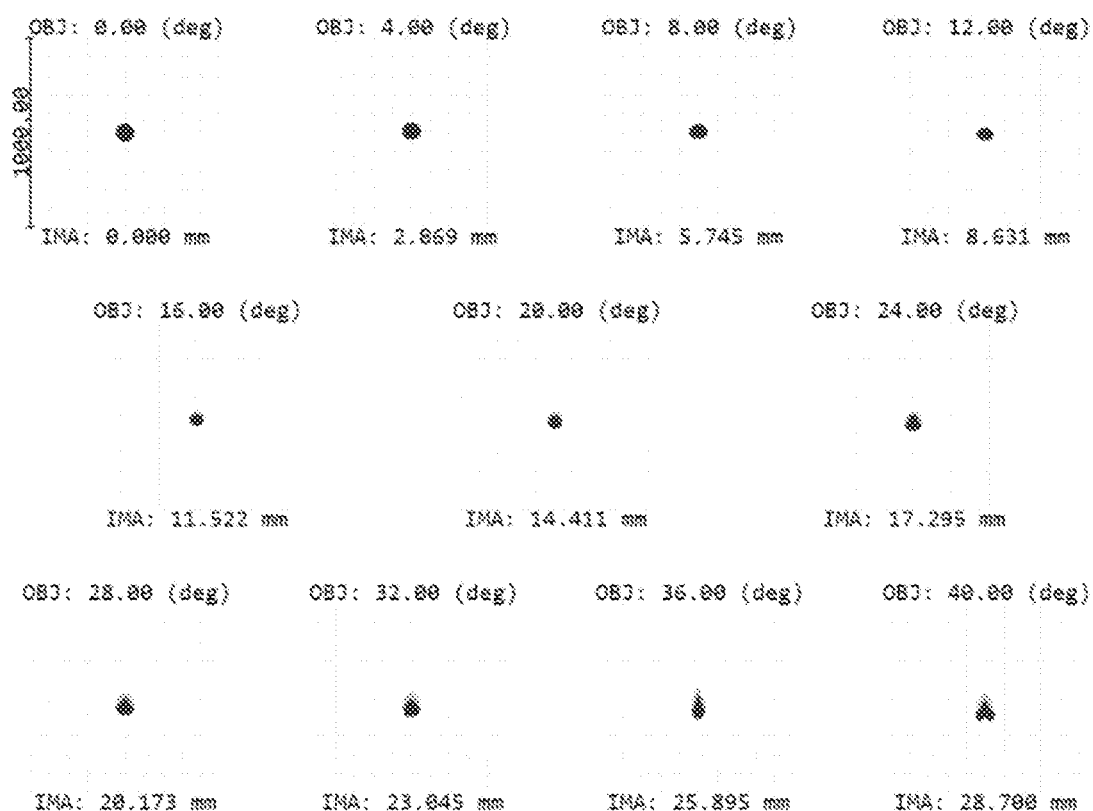
FIG. 6 is a schematic diagram of a dispersed spot array of the eyepiece optical system according to Example 2 of the present invention.
Figure 7:
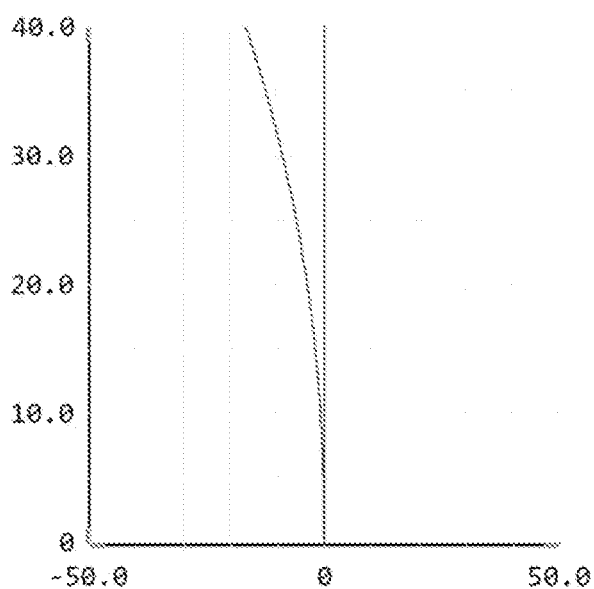
FIG. 7 is a schematic diagram of distortion of the eyepiece optical system according to Example 2 of the present invention.
Figure 8:
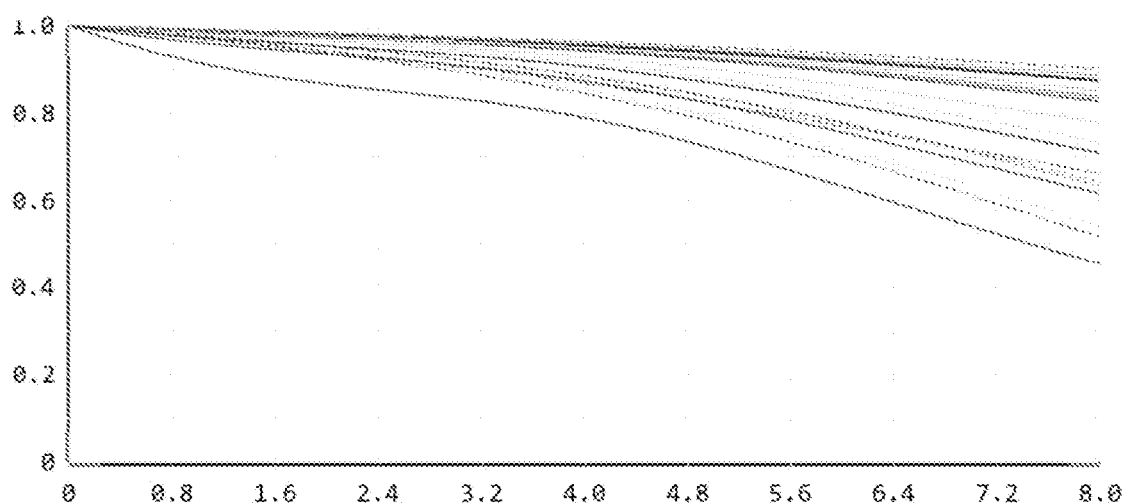
FIG. 8 is a schematic diagram of an optical transfer function MTF of the eyepiece optical system according to Example 2 of the present invention.

FIGS. 6, 7, and 8 are respectively diagrams showing the dispersed spot array, distortion and optical transfer function MTF of the optical system, which reflect that the lights of respective view fields in this example has high resolution and small optical distortion in the unit pixel of the image plane (the display device 1), the resolution per 8 mm per unit period reaches more than 0.45, the aberration of the optical system is well corrected, and a display image of uniformity and high optical performance can be observed through the eyepiece optical system.

Example 3

This example is basically the same as Example 1. The similarities will not be described here anymore, and as shown in FIGS. 9-12, the difference is that:

The eyepiece design data of Example 3 is as shown in the table below:

lens) consisting of the optical binary surface and the Fresnel surface as in Examples 1 and 2. As shown in the figure, along an optical axis direction from human eyes to a micro-display screen, sequentially arranged are an even aspheric surface serving as the surface 1; an optical spherical surface serving as the surface 2; a binary surface pattern using an aspheric surface as a base, serving as the surface 3; and a Fresnel optical surface pattern using an aspheric surface as a base, serving as the surface 4, and the parameters of binary surface are:

Coefficient on r^4: 2.5058457e-06
    Coefficient on r^6: −4.5660741e-09
    Coefficient on r^8: 2.4439329e-12
    Coefficient on r^10: −4.3058515e-16
    Normalization Radius: 100
    Coefficient on p^2: −78280.061
    Coefficient on p^4: 241337
    Coefficient on p^6: −1308070.6

The pattern parameters of the Fresnel surface are:
    Coefficient on r^4: 8.6741194e-08
    Coefficient on r^6: −1.36423e-09
    Coefficient on r^8: −4.884765e-14
    Coefficient on r^10: 6.3941854e-16

Example 3 is mainly characterized by its higher optical indexes compared with those of Examples 1 and 2, such as a higher optical transfer function index and better imaging quality. The optical system has a focal length of F and a clear aperture of D, and F/D is 4.69. A single sided focal length of the binary surface is F2, F2/F is 10.78, the radius value of the binary surface is R2, and F2/R2 is 0.56. The Fresnel surface has a focal length of F3 and a radius value of R3, F3/R3 is −1.68, and F3/F is 1.35.

Figure 10:
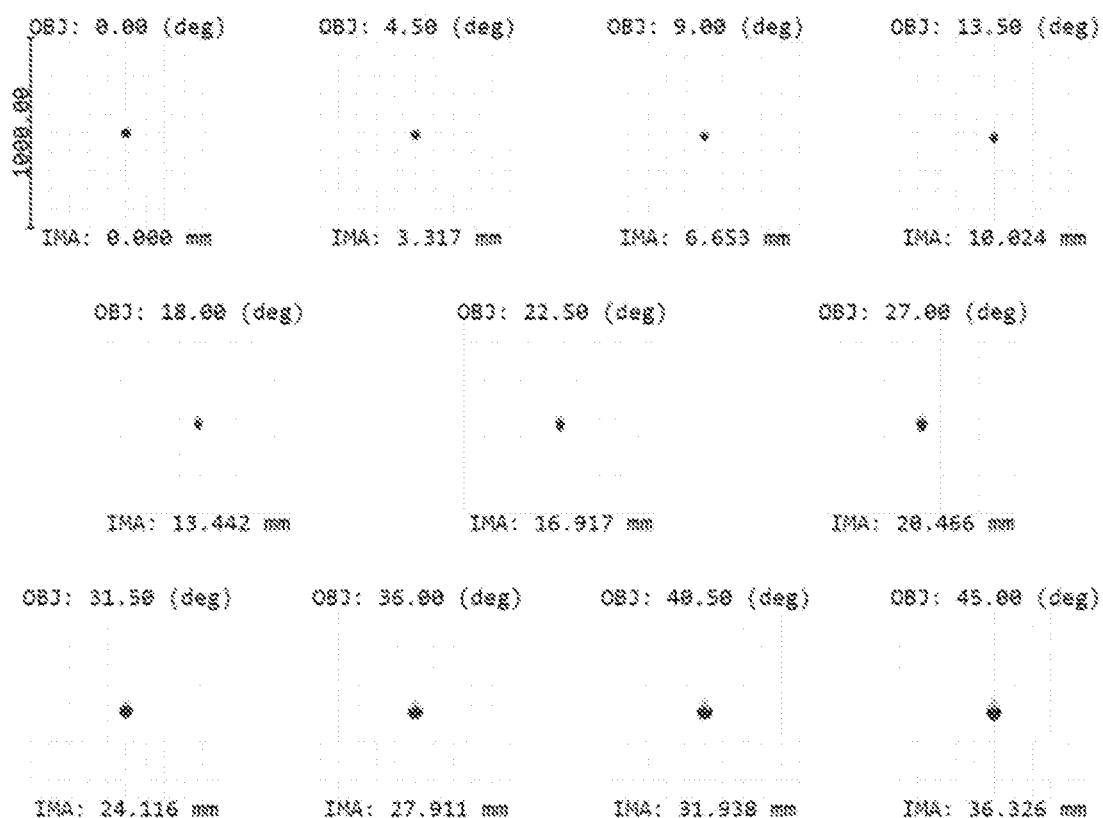
FIG. 10 is a schematic diagram of a dispersed spot array of the eyepiece optical system according to Example 3 of the present invention.
Figure 11:
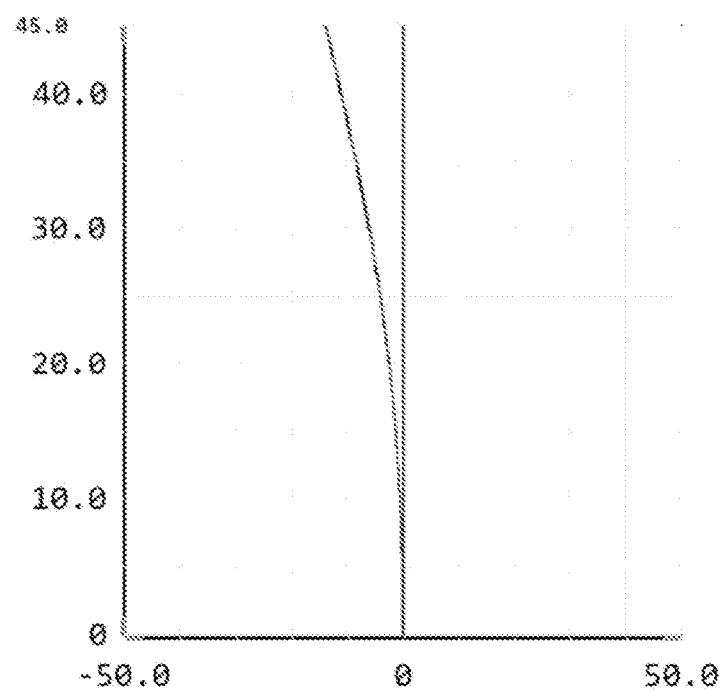
FIG. 11 is a schematic diagram of distortion of the eyepiece optical system according to Example 3 of the present invention.
Figure 12:
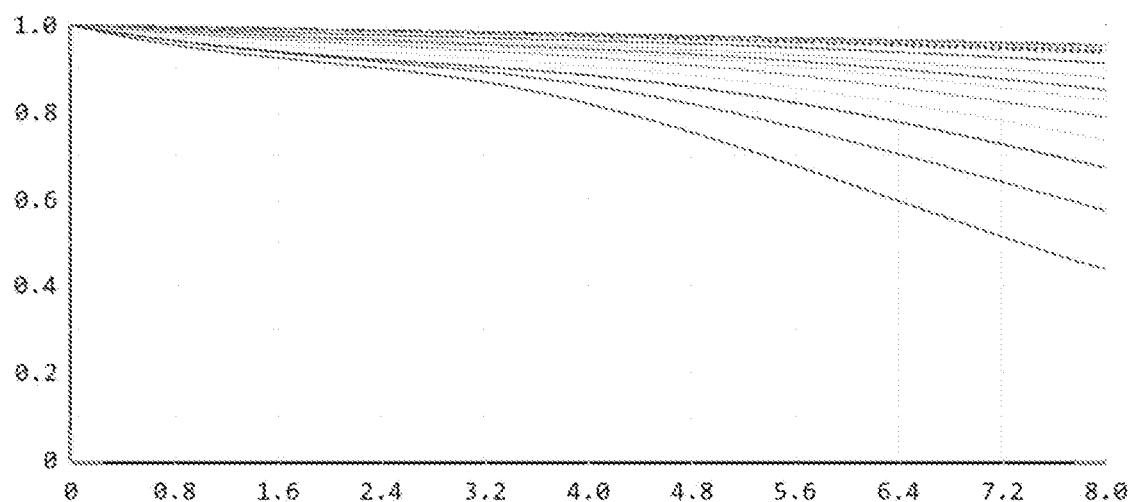
FIG. 12 is a schematic diagram of an optical transfer function MTF of the eyepiece optical system according to Example 3 of the present invention.

FIGS. 10, 11, and 12 are respectively diagrams showing the dispersed spot array, distortion and optical transfer function MTF of the optical system, which reflect that the lights of respective view fields in this example has high resolution and small optical distortion in the unit pixel of the image plane (the display device I), the resolution per 8 mm per unit period reaches more than 0.4, the aberration of the optical system is well corrected, and a display image of uniformity and high optical performance can be observed through the eyepiece optical system.

| Surface | Surface pattern | Radius | Thickness | Glass Refractive index | Abbe number | Effective aperture | Cone coefficient |
|---|---|---|---|---|---|---|---|
| Diaphragm |  | Infinity | 14.96 |  |  | 9.00 |  |
| 2 |  | 80.92 | 6.16 | 1.59 | 67.33 | 45.49 | −10.66 |
| 3 |  | −268.10 | 22.72 |  |  | 46.62 |  |
| 4 | Binary surface | 807.44 | 6.00 | 1.59 | 67.33 | 68.07 | −30.02 |
| 5 | Fresnel surface | −33.78 | 30.00 |  |  | 70.79 | −1.96 |
| Image surface |  | Infinity |  |  |  | 72.71 |  |

Figure 9:
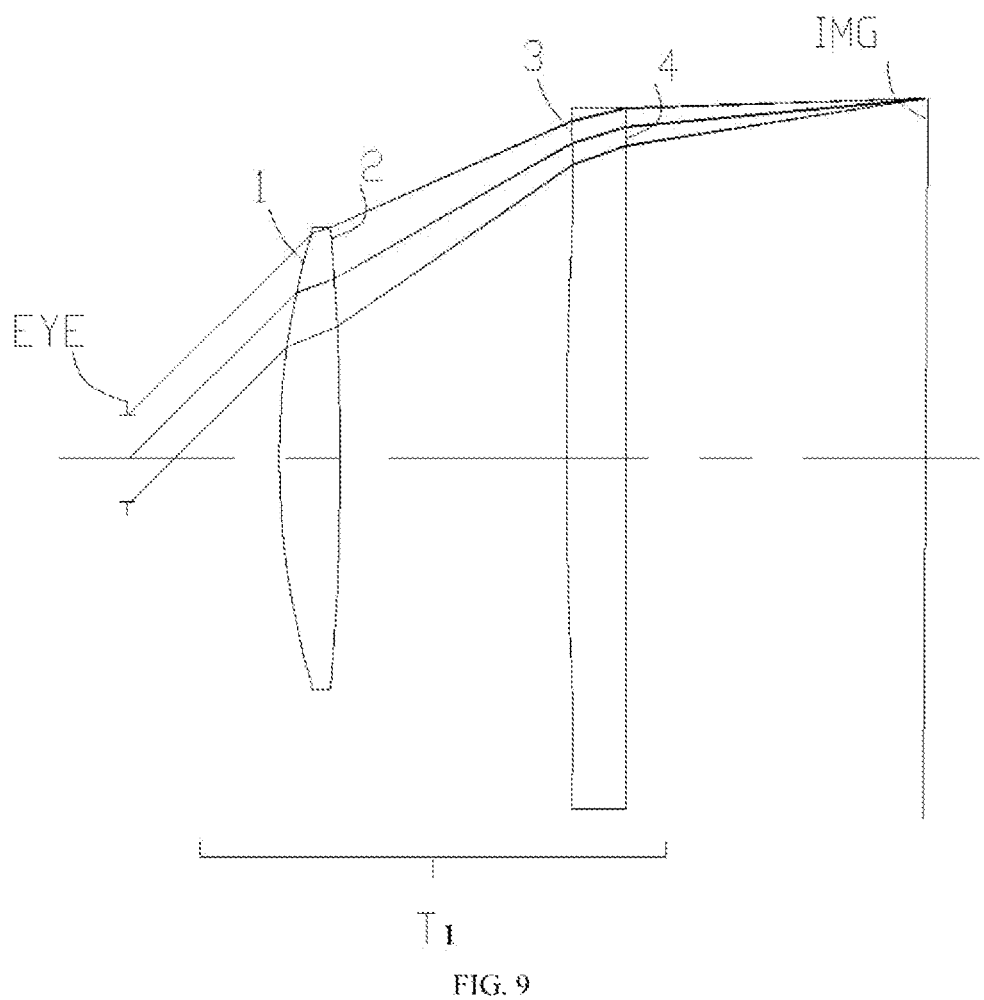
FIG. 9 is a schematic structural diagram of an eyepiece optical system according to Example 3 of the present invention.

FIG. 9 is a 2D structural diagram of the eyepiece optical system of Example 3. Example 3 is mainly characterized in that the optical structure consists of two optical lenses, wherein the lens group T1 consists of a traditional even aspherical positive lens (the second lens) and a lens (the first Example 4

This example is basically the same as Example 3. The similarities will not be described here anymore, and as shown in FIGS. 13-16, the difference is that:

The eyepiece design data of Example 4 is as shown in the table below:

| Surface | Surface pattern | Radius | Thickness | Glass Refractive index | Abbe number | Effective aperture | Cone coefficient |
|---|---|---|---|---|---|---|---|
| Diaphragm | | Infinity | 14.77 | | | 9.00 | |
| 2 | | 63.88 | 8.40 | 1.59 | 67.33 | 46.35 | −11.54 |
| 3 | | −91.48 | 24.40 | | | 47.15 | |
| 4 | Binary surface | 450.78 | 2.07 | 1.59 | 67.33 | 62.31 | 4.31 |
| 5 | Fresnel surface | −24.92 | 0.44 | | | 64.06 | −1.99 |
| 6 | | 89.55 | 7.95 | 1.82 | 46.57 | 62.65 | |
| 7 | | 211.06 | 11.00 | | | 60.63 | |
| Image surface | | Infinity | | | | 55.40 | |

Figure 13:
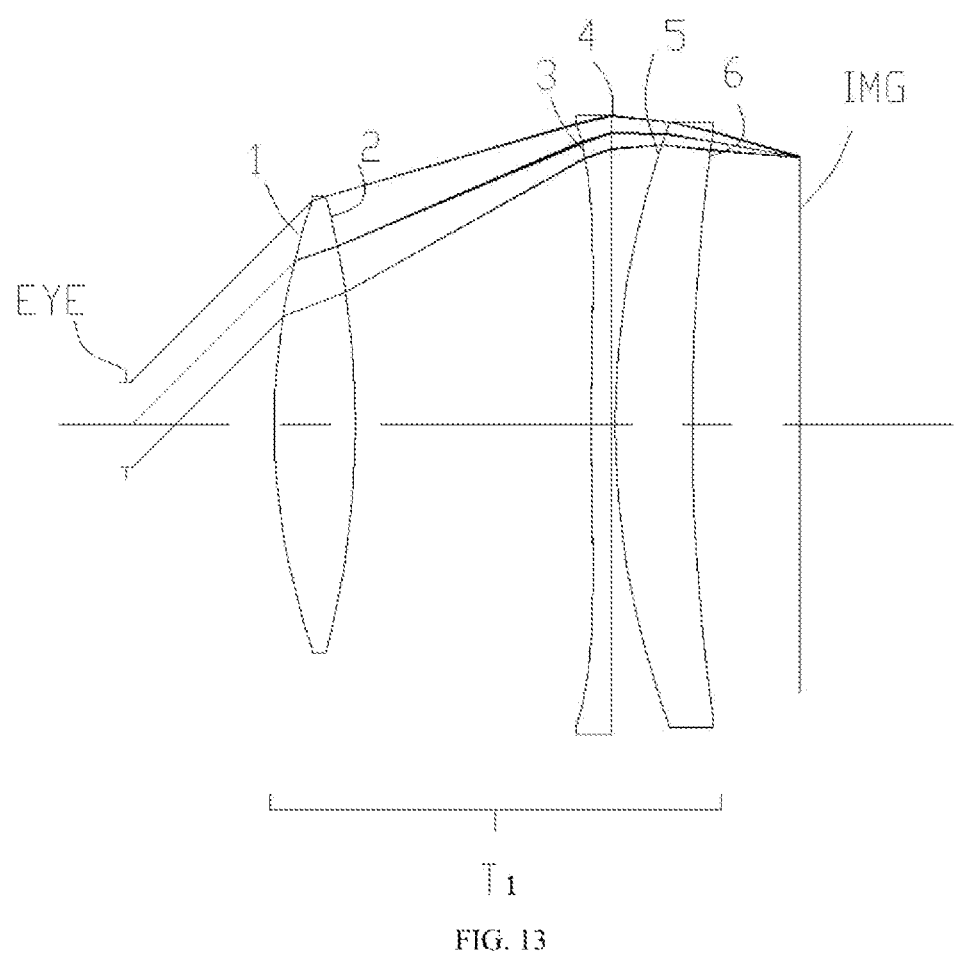
FIG. 13 is a schematic structural diagram of an eyepiece optical system according to Example 4 of the present invention.

FIG. 13 is a 2D structural diagram of the eyepiece optical system of Example 4. Compared with Examples 1, 2 and 3, Example 4 is mainly characterized in that the optical structure consists of three optical lenses, wherein the lens group T1 consists of a traditional even aspheric positive lens (the second lens) and a traditional spherical lens (the third lens), as well as a lens (the first lens) consisting of the optical binary surface and the Fresnel surface as in Examples 1 and 2. As shown in the figure, along an optical axis direction from human eyes to a micro-display screen, sequentially arranged are an even aspheric surface serving as the surface 1; an optical spherical surface serving as the surface 2; a binary surface pattern using an aspheric surface as a base, serving as the surface 3; a Fresnel optical surface pattern using a flat surface as a base, serving as the surface 4; an optical spherical surface serving as the surface 5; and an optical spherical surface serving as the surface 6, and the parameters of the binary surface are:

Coefficient on r^4: −9.6592887e-07
Coefficient on r^6: −3.2687211e-09
Coefficient on r^8: 1.7229818e-12
Coefficient on r^10: −2.932986e-16
Normalization Radius: 100
Coefficient on p^2: −127330.98
Coefficient on p^4: 390081.49
Coefficient on p^6: −2999556.9

The pattern parameters of the Fresnel surface are:

Coefficient on r^4: −1.9490772e-06
Coefficient on r^6: −9.626122e-10
Coefficient on r^8: −7.1633338e-14
Coefficient on r^10: 1.0645464e-15

Example 2 is mainly characterized by its higher optical indexes compared with those of Example 1, such as a higher optical transfer function index and better imaging quality compared with those of Example 1. The optical system has a focal length of F and a clear aperture of D, and F/D is 3.26. A single sided focal length of the binary surface is F2, F2/F is 9.22, the radius value of the binary surface is R2, and F2/R2 is 0.60. The Fresnel surface has a focal length of F3 and a radius value of R3, F3/R3 is −1.68, and F3/F is 1.43.

Figure 14:
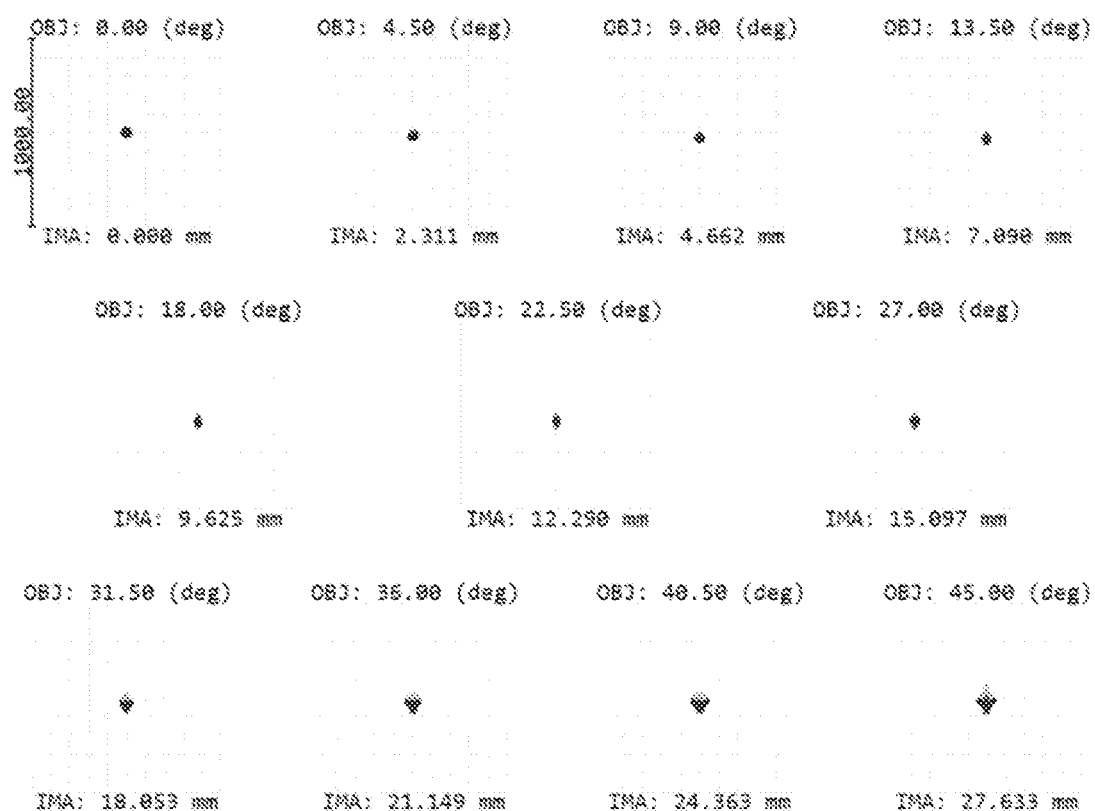
FIG. 14 is a schematic diagram of a dispersed spot array of the eyepiece optical system according to Example 4 of the present invention.
Figure 15:
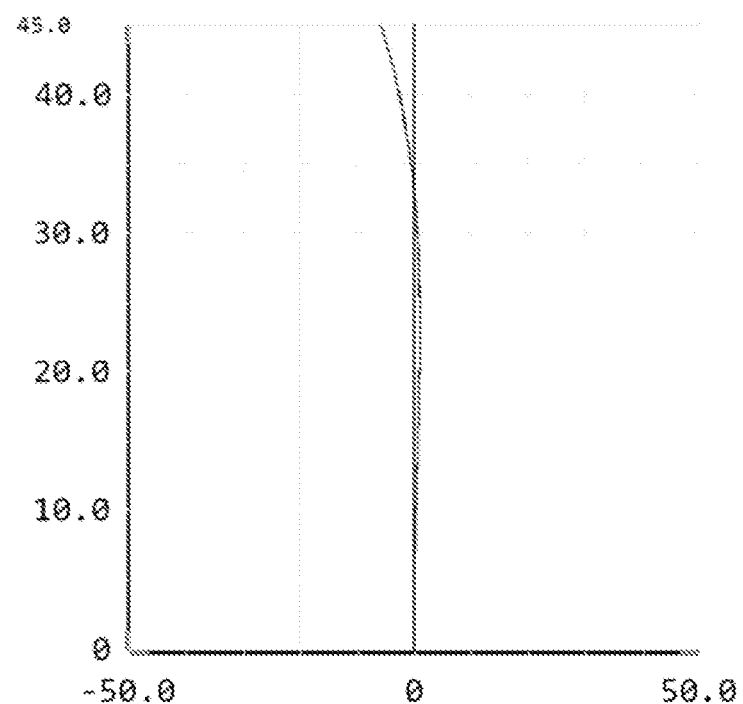
FIG. 15 is a schematic diagram of distortion of the eyepiece optical system according to Example 4 of the present invention.
Figure 16:
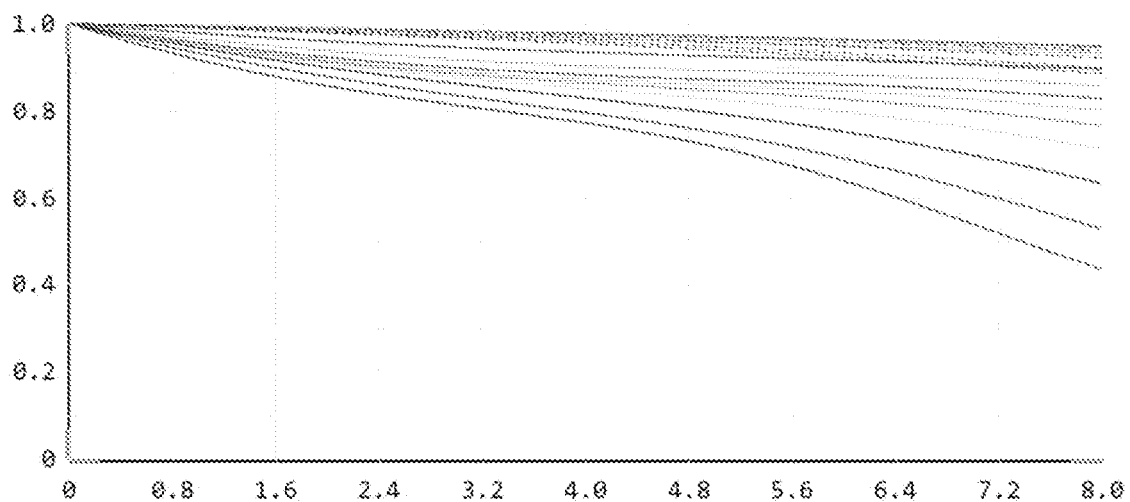
FIG. 16 is a schematic diagram of an optical transfer function MTF of the eyepiece optical system according to Example 4 of the present invention.

FIGS. 14, 15, and 16 are respectively diagrams showing the dispersed spot array, distortion and optical transfer function MTF of the optical system, which reflect that the lights of respective view fields in this example has high resolution and small optical distortion in the unit pixel of the image plane (the display device 1), the resolution per 8 mm per unit period reaches more than 0.4, the aberration of the optical system is well corrected, and a display image of uniformity and high optical performance can be observed through the eyepiece optical system.

Example 5

This example is basically the same as Example 1. The similarities will not be described here anymore, and as shown in FIGS. 17-20, the difference is that:

The eyepiece design data of Example 5 is as shown in the table below:

| Surface | Surface pattern | Radius | Thickness | Glass Refractive index | Abbe number | Effective aperture | Cone coefficient |
|---|---|---|---|---|---|---|---|
| Diaphragm | | Infinity | 11.66 | | | 8.00 | |
| 2 | | 40.45 | 8.64 | 1.73 | 51.49 | 40.30 | −6.24 |
| 3 | | −104.09 | 9.32 | | | 41.04 | |
| 4 | Binary surface | 166.58 | 1.85 | 1.52 | 63.50 | 44.95 | 23.63 |
| 5 | | 132.95 | 2.93 | | | 44.75 | |
| 6 | | 661.62 | 2.40 | 1.62 | 63.41 | 44.83 | |
| 7 | Fresnel surface | −17.41 | 0.13 | | | 44.85 | −2.05 |
| 8 | | 39.54 | 7.33 | 1.88 | 37.21 | 40.35 | |
| 9 | | 46.71 | 5.06 | | | 35.26 | |
| Image surface | | Infinity | | | | 32.82 | |

Figure 17:
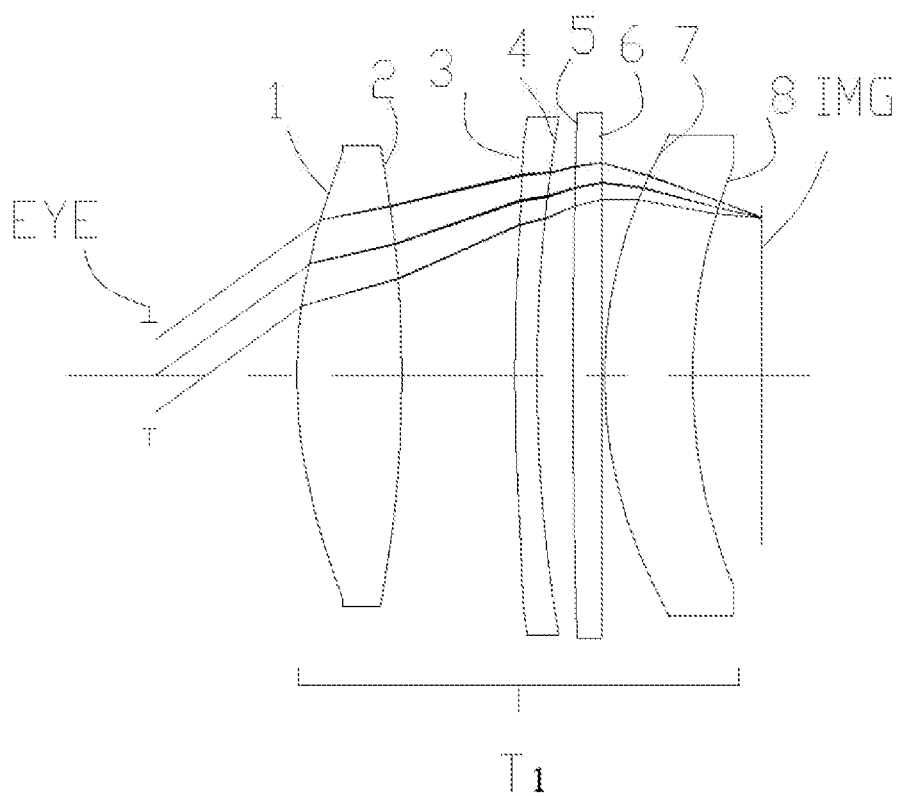
FIG. 17 is a schematic structural diagram of an eyepiece optical system according to Example 5 of the present invention.

FIG. 17 is a 2D structural diagram of the eyepiece optical system of Example 5. Compared with the aforementioned examples, Example 5 is mainly characterized in that the optical structure consists of four optical lenses, wherein the lens group T1 consists of a traditional even aspheric positive lens (the fourth lens), a binary surface lens (the fifth lens) that uses an aspheric surface as a base, a Fresnel lens (the sixth lens) that uses a flat surface as a base, and a traditional spherical lens (the seventh lens). As shown in the figure, along an optical axis direction from human eyes to a micro-display screen, sequentially arranged are an even aspheric surface serving as the surface 1; an optical spherical surface serving as the surface 2; a binary surface pattern using an aspheric surface as a base, serving as the surface 3; a Fresnel optical surface pattern serving as the surface 4; an optical spherical surface serving as the surface 5; and an optical spherical surface serving as the surface 6, and the parameters of the binary surface are:

Coefficient on r^4: −4.7151448e-06
Coefficient on r^6: −2.0289873e-09
Coefficient on r^8: 6.6813638e-12
Coefficient on r^10: 1.4757494e-14
Normalization Radius: 100
Coefficient on p^2: −202429.97
Coefficient on p^4: 341803.83
Coefficient on p^6: 2000968.6
The pattern parameters of the Fresnel surface are:
Coefficient on r^4: −4.3338908e-06
Coefficient on r^6: 8.0063342e-10
Coefficient on r^8: 7.8830811e-12
Coefficient on r^10: 1.4894396e-14

Example 5 is mainly characterized by its higher optical indexes compared with those of Examples 1 and 2, such as a higher optical transfer function index and better imaging quality compared with those of Example 1. The optical system has a focal length of F and a clear aperture of D, and F/D is 2.40. A single sided focal length of the binary surface is F2, F2/F is 7.54, the radius value of the binary surface is R2, and F2/R2 is 0.87. The Fresnel surface has a focal length of F3 and a radius value of R3, F3/R3 is −1.62, and F3/F is 1.46.

Figure 18:
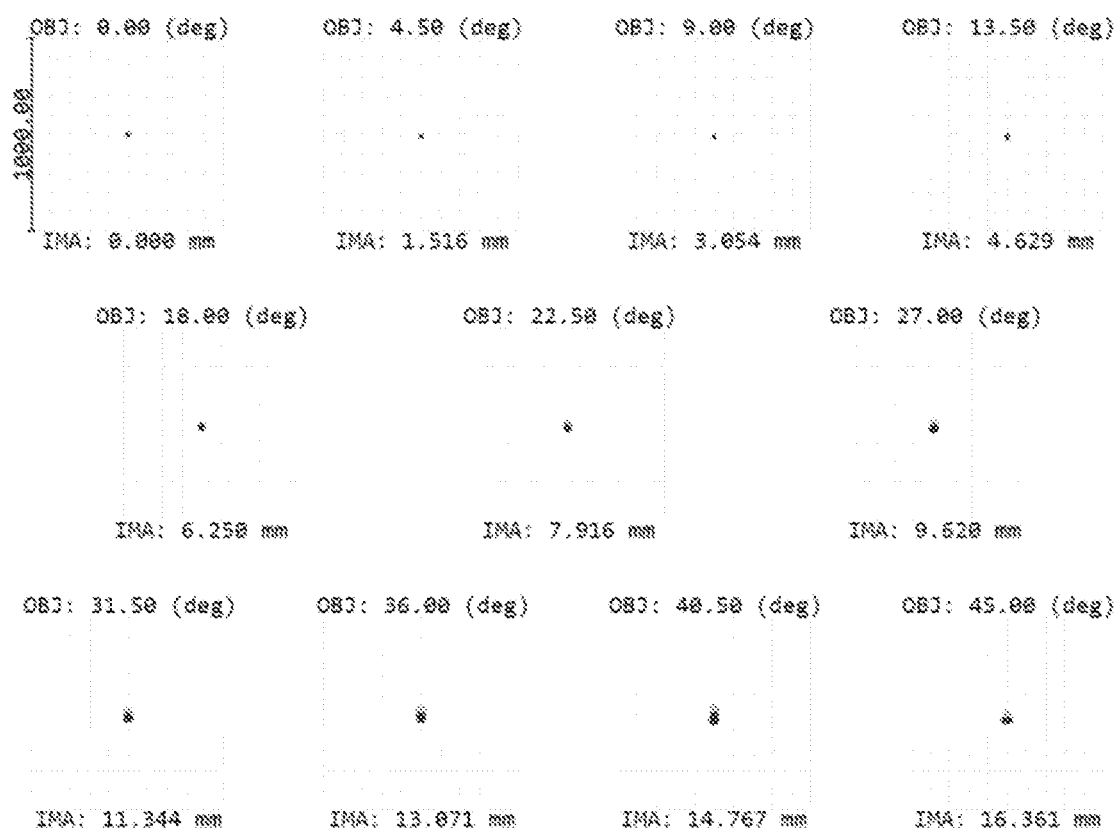
FIG. 18 is a schematic diagram of a dispersed spot array of the eyepiece optical system according to Example 5 of the present invention.
Figure 19:
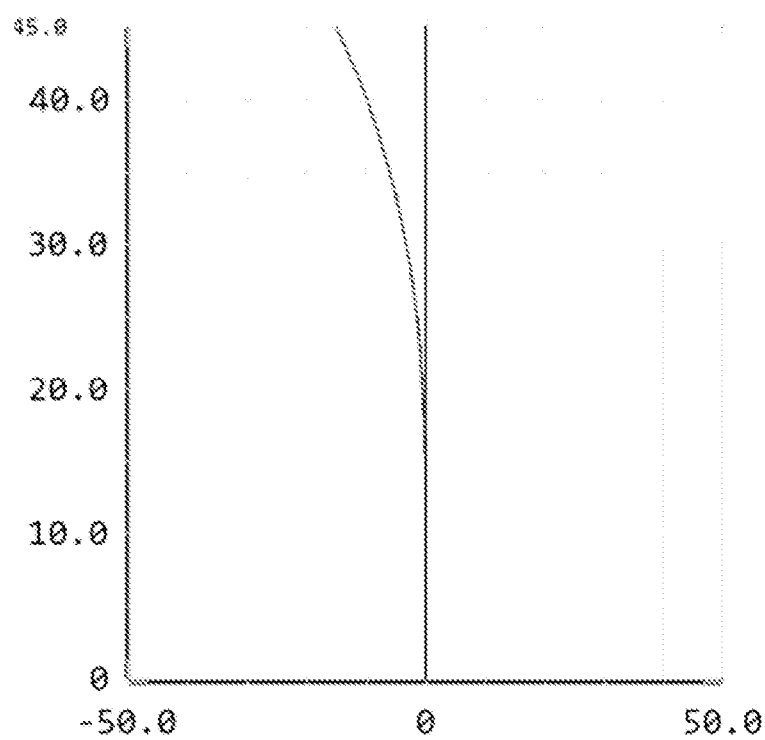
FIG. 19 is a schematic diagram of distortion of the eyepiece optical system according to Example 5 of the present invention.
Figure 20:
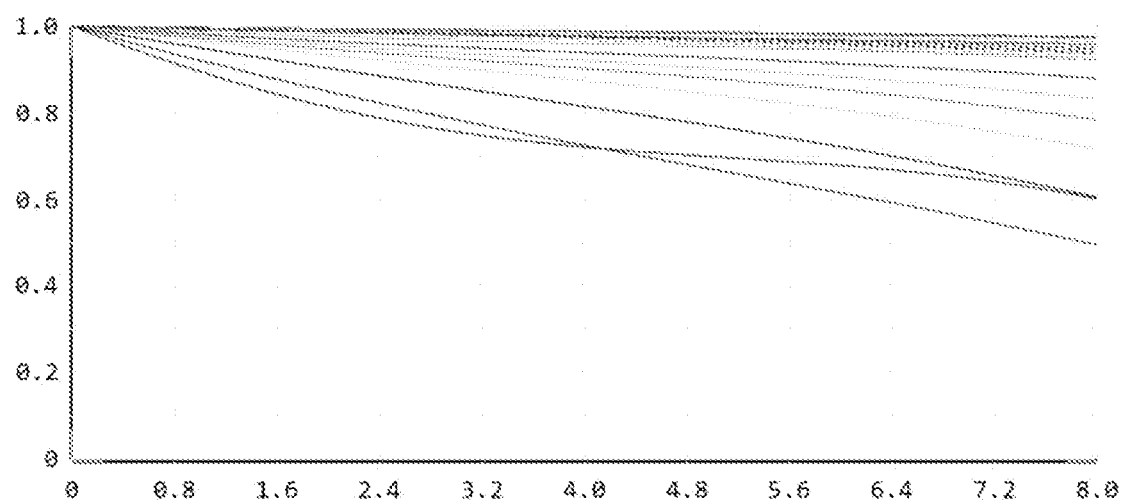
FIG. 20 is a schematic diagram of an optical transfer function MTF of the eyepiece optical system according to Example 5 of the present invention.

FIGS. 18, 19, and 20 are respectively diagrams showing the dispersed spot array, distortion and optical transfer function MTF of the optical system, which reflect that the lights of respective view fields in this example has high resolution and small optical distortion in the unit pixel of the image plane (the display device 1), the resolution per 8 mm per unit period reaches more than 0.5, the aberration of the optical system is well corrected, and a display image of uniformity and high optical performance can be observed through the eyepiece optical system.

Example 6

This example is basically the same as Example 5. The similarities will not be described here anymore, and as shown in FIGS. 21-24, the difference is that:

The eyepiece design data sixth Example 6 is as shown in the table below:

| Surface | Surface pattern | Radius | Thickness | Glass Refractive index | Abbe number | Net caliber | Cone coefficient |
|---|---|---|---|---|---|---|---|
| Diaphragm |  | Infinity | 11.77 |  |  | 8.00 |  |
| 2 |  | 47.73 | 8.27 | 1.73 | 51.49 | 34.00 | 5.20 |
| 3 |  | −35.64 | 4.39 |  |  | 35.49 |  |
| 4 | Binary surface | −30.84 | 3.79 | 1.52 | 63.50 | 39.81 | −9.41 |
| 5 |  | −59.70 | 7.13 |  |  | 40.28 |  |
| 6 |  | 550.82 | 2.72 | 1.62 | 63.41 | 39.14 |  |
| 7 | Fresnel | −2356.42 | 0.17 |  |  | 38.60 | 30.10 |
| 8 |  | 48.42 | 7.66 | 1.88 | 37.21 | 38.28 |  |
| 9 |  | 60.36 | 1.60 |  |  | 33.46 |  |
| 10 |  |  | 2.07 |  |  | 34.22 |  |
| Image surface |  |  |  |  |  | 32.16 |  |

Figure 21:
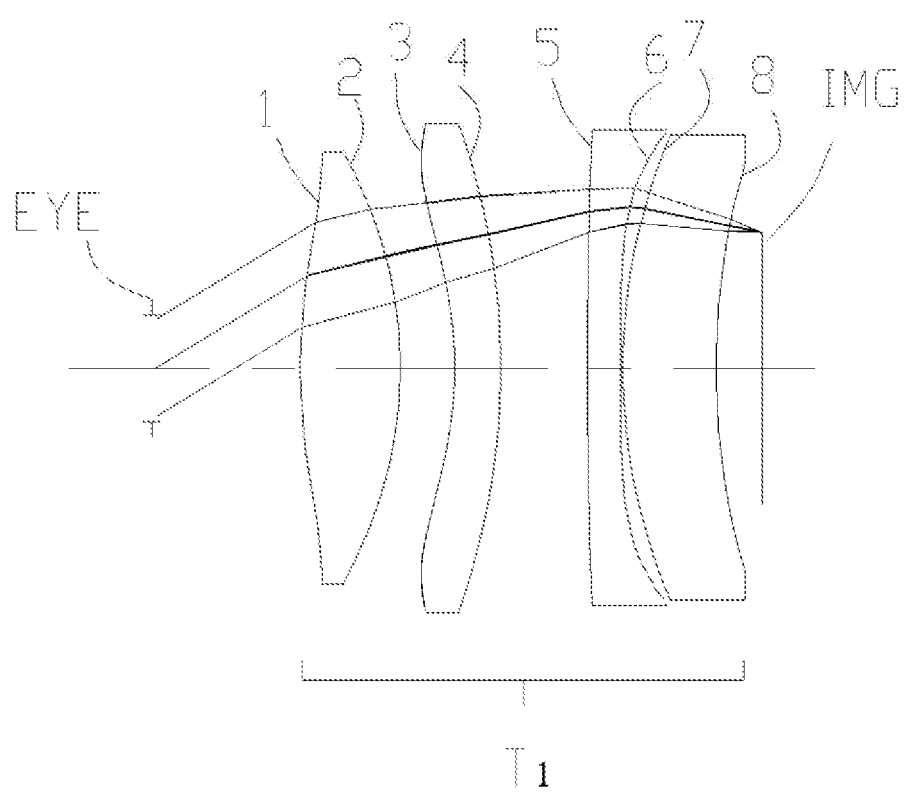
FIG. 21 is a schematic structural diagram of an eyepiece optical system according to Example 6 of the present invention.

FIG. 21 is a 2D structural diagram of the eyepiece optical system of Example 6. Compared with the aforementioned examples. Example 6 is mainly characterized in that the optical structure consists of four optical lenses, wherein the lens group T1 consists of a traditional even aspheric positive lens (the fourth lens), a binary surface lens (the fifth lens) that uses an aspheric surface as a base, a Fresnel lens (the sixth lens) that uses an aspheric surface as a base, and a traditional spherical lens (the seventh lens). As shown in the figure, along an optical axis direction from human eyes to a micro-display screen, sequentially arranged are an even aspheric surface serving as the surface 1; an optical spherical surface serving as the surface 2; a binary surface pattern using an aspheric surface as a base, serving as the surface 3; a Fresnel optical surface pattern using an aspheric surface as a base, serving as the surface 4; an optical spherical surface serving as the surface 5; and an optical spherical surface serving as the surface 6, and the parameters of the binary surface are:

Coefficient on r^4: −8.851981e-06
Coefficient on r^6: 2.0590422e-08
Coefficient on r^8: 1.9837858e-10
Coefficient on r^10: −3.1388739e-13
Normalization Radius: 100
Coefficient on p^2: −226371.31
Coefficient on p^4: 2380000.4
Coefficient on p^6: −16777571
The pattern parameters of the Fresnel surface are:
Coefficient on r^4: 2.5662288e-05
Coefficient on r^6: 3.7499227e-09
Curvature: −0.062758355
Conic: −3.4210167
Term on Fresnel r^2: 0
Term on Fresnel r^4: −3.2648785e-05
Term on Fresnel r^6: 2.016685e-08
Term on Fresnel r^8: −5.6229076e-11
Term on Fresnel r^10: 1.1869512e-13

Example 6 is mainly characterized by its higher optical indexes compared with those of Examples 1 and 2, such as a higher optical transfer function index and better imaging quality compared with those of Example 1. The optical system has a focal length of F and a clear aperture of D, and F/D is 2.32. A single sided focal length of the binary surface is F2. F2/F is −4.27, the radius value of the binary surface is R2, and F2/R2 is 2.58. The Fresnel surface has a focal length of F3 and a radius value of R3, F3/R3 is −0.011, and F3/F is 1.37.

Figure 22:
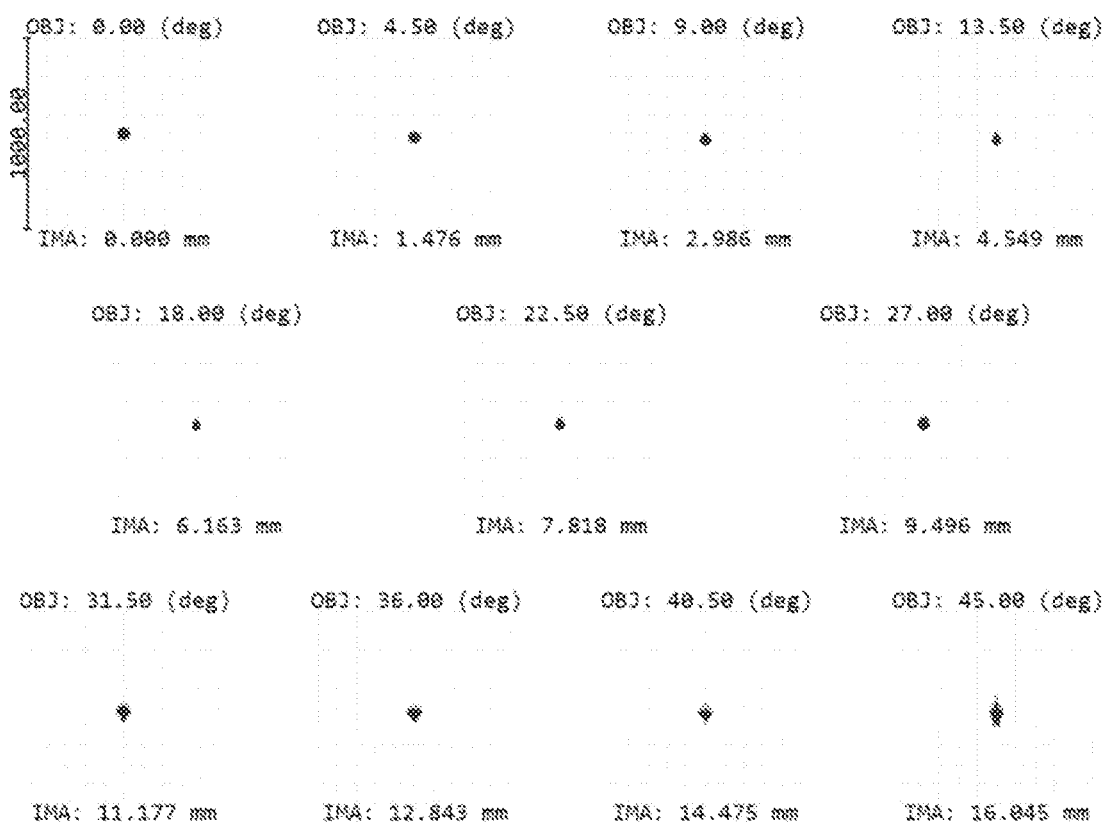
FIG. 22 is a schematic diagram of a dispersed spot array of the eyepiece optical system according to Example 6 of the present invention.
Figure 23:
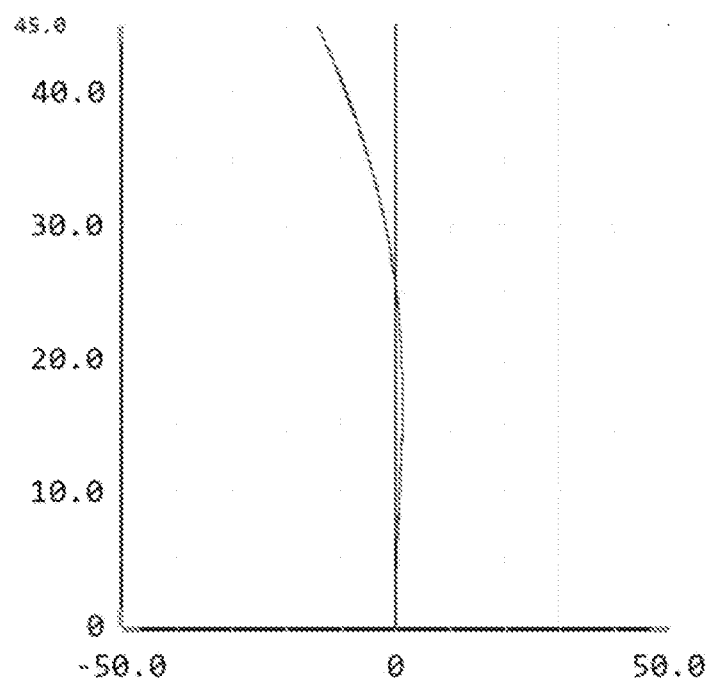
FIG. 23 is a schematic diagram of distortion of the eyepiece optical system according to Example 6 of the present invention.
Figure 24:
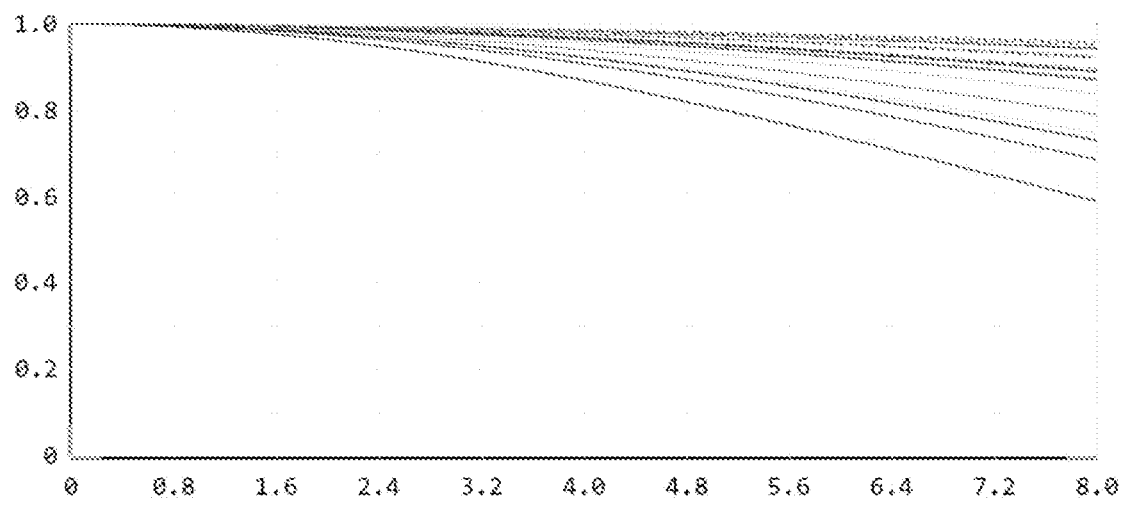
FIG. 24 is a schematic diagram of an optical transfer function MTF of the eyepiece optical system according to Example 6 of the present invention.

FIGS. 22, 23, and 24 are respectively diagrams showing the dispersed spot array, distortion, and optical transfer function MTF of the optical system, which reflect that the lights of respective view fields in this example has high resolution and small optical distortion in the unit pixel of the image plane (the display device 1), the resolution per 8 mm per unit period reaches more than 0.6, the aberration of the optical system is well corrected, and a display image of uniformity and high optical performance can be observed through the eyepiece optical system.

All data of the aforementioned Examples 1-6 meet other parameters recorded in the Summary of the present invention, as shown in the table below:

|  | F | F2 | F3 | FOV (°) |
|---|---|---|---|---|
| Example 1 | 33.05 | −215.85 | 29.21 | 56 |
| Example 2 | 41.17 | −4780 | 40.86 | 80 |
| Example 3 | 42.2 | 454.74 | 56.92 | 91 |
| Example 4 | 29.3 | 270.41 | 41.99 | 90 |
| Example 5 | 19.24 | 145.07 | 28.18 | 89 |
| Example 6 | 18.66 | −79.668 | 25.61 | 90 |

Example 7

An eyepiece system is provided, wherein the eyepiece system is provided with the aforementioned eyepiece optical structure thereon.

Example 8

An optical device is provided, wherein the optical device is provided with the aforementioned eyepiece system thereon.

It should be understood that improvements or changes can be made by those of ordinary skills in the art according to the aforementioned description, and all these improvements and changes should fall within the claimed scope of the appended claims of the present invention.

What is claimed is:

1. An eyepiece optical structure, comprising a lens group T1 on which an optical binary surface pattern and a Fresnel surface pattern distributed in a direction from a human eye viewing side to a display device side are arranged:
    wherein the lens group T1 has a focal length of F and a clear aperture of D, and F and D satisfy the following relational expression: $1.9 \leq F/D$;
    the optical binary surface pattern has a focal length of F2 and a radius value of R2; F and F2 satisfy the following relational expression: $-120 < F2/F < 10.78$; and F2 and R2 satisfy the following relational expression: $0.5 \leq F2/R2 \leq 14.50$;
    the Fresnel surface pattern has a focal length of F3 and a radius value of R3, and F3 and R3 satisfy the following relational expression:

$-1.88 \leq F3/R3 \leq -0.010$;

the lens group T1 is composed of a first lens; and in the direction from the human eye viewing side to the display device side, the surfaces at two sides of the first lens are respectively provided with the optical binary surface pattern and the Fresnel surface pattern.

2. The eyepiece optical structure according to claim 1, wherein the optical binary surface pattern of the first lens uses an aspheric surface as a base; and the Fresnel surface pattern of the first lens uses a flat surface as a base.

3. The eyepiece optical structure according to claim 1, wherein F and F3 satisfy the following relational expression:

$0.70 \leq F3/F$.

4. The eyepiece optical structure according to claim 1, wherein the Fresnel surface pattern is composed of a combination of Fresnel surfaces with different parameters according to continuous outer diameter values.

5. The eyepiece optical structure according to claim 1, wherein the base of the optical binary surface pattern is a flat surface, spherical surface or aspheric surface; and the base of the Fresnel surface pattern is a flat surface, spherical surface or aspheric surface.

6. The eyepiece optical structure according to claim 1, wherein the optical components constituting the lens group T1 are made of an optical glass or plastic material.

7. An eyepiece system, wherein the eyepiece system is provided with the eyepiece optical structure according to claim 1 thereon.

8. An optical device, wherein the optical device is provided with the eyepiece system according to claim 7 thereon.

9. An eyepiece optical structure, comprising a lens group T1 on which an optical binary surface pattern and a Fresnel surface pattern distributed in a direction from a human eye viewing side to a display device side are arranged;
    wherein the lens group T1 has a focal length of F and a clear aperture of D, and F and D satisfy the following relational expression: $1.9 \leq F/D$;
    the optical binary surface pattern has a focal length of F2 and a radius value of R2; F and F2 satisfy the following relational expression: $-120 < F2/F < 10.78$; and F2 and R2 satisfy the following relational expression: $0.5 \leq F2/R2 \leq 14.50$;
    the Fresnel surface pattern has a focal length of F3 and a radius value of R3, and F3 and R3 satisfy the following relational expression:

$-1.88 \leq F3/R3 \leq -0.010$;

the lens group T1 is composed of two lenses, comprising a first lens and a second lens located at the front end of the first lens; and in the direction from the human eye viewing side to the display device side, the surfaces at two sides of the first lens are respectively provided with the optical binary surface pattern and the Fresnel surface pattern;
    the second lens is a traditional even aspheric positive lens; and in the direction from the human eye viewing side to the display device side, the surfaces at two sides of the second lens are respectively provided with an even aspheric surface and an optical spherical surface.

10. The eyepiece optical structure according to claim 9, wherein the optical binary surface pattern of the first lens uses an aspheric surface as a base; and the Fresnel surface pattern of the first lens uses an aspherical surface as a base.

11. An eyepiece optical structure, comprising a lens group T1 on which an optical binary surface pattern and a Fresnel surface pattern distributed in a direction from a human eye viewing side to a display device side are arranged;
    wherein the lens group T1 has a focal length of F and a clear aperture of D, and F and D satisfy the following relational expression: $1.9 \leq F/D$;

the optical binary surface pattern has a focal length of F2 and a radius value of R2; F and F2 satisfy the following relational expression: −120<F2/F<10.78; and F2 and R2 satisfy the following relational expression: 0.5≤F2/R2≤14.50;

the Fresnel surface pattern has a focal length of F3 and a radius value of R3, and F3 and R3 satisfy the following relational expression:

$-1.88 \leq F3/R3 \leq -0.010$;

the lens group T1 is composed of three lenses, including a first lens and a second lens located at the front end of the first lens, wherein the second lens is a traditional even aspherical positive lens; and in the direction from the human eye viewing side to the display device side, the surfaces at two sides of the second lens are respectively provided with an even aspheric surface and an optical spherical surface;

a third lens is arranged downstream of the first lens, and the third lens is a traditional spherical lens; and both surfaces at two sides of the third lens are provided with optical spherical surfaces.

12. The eyepiece optical structure according to claim 11, wherein the optical binary surface pattern of the first lens uses an aspheric surface as a base; and the Fresnel surface pattern of the first lens uses a flat surface as a base.

13. An eyepiece optical structure, comprising a lens group T1 on which an optical binary surface pattern and a Fresnel surface pattern distributed in a direction from a human eye viewing side to a display device side are arranged;

wherein the lens group T1 has a focal length of F and a clear aperture of D, and F and D satisfy the following relational expression: 1.9≤F/D;

the optical binary surface pattern has a focal length of F2 and a radius value of R2; F and F2 satisfy the following relational expression: −120<F2/F<10.78; and F2 and R2 satisfy the following relational expression: 0.5≤F2/R2≤14.50;

the Fresnel surface pattern has a focal length of F3 and a radius value of R3, and F3 and R3 satisfy the following relational expression:

$-1.88 \leq F3/R3 \leq -0.010$;

the lens group T1 is composed of a combination of a fourth lens, a fifth lens, a sixth lens and a seventh lens which are sequentially arranged in the direction from the human eye viewing side to the display device side, and any one of first, second and third schemes is adopted:

first scheme:

the fourth lens is a traditional even aspheric positive lens; the fifth lens is a binary surface lens using an aspheric surface as a base; the sixth lens is a Fresnel lens using a flat surface as a base; and the seventh lens is a traditional spherical lens;

second scheme:

in the direction from the human eye viewing side to the display device side, the surfaces at two sides of the fourth lens are respectively provided with an even aspheric surface and an optical spherical surface, the surfaces at two sides of the fifth lens are respectively provided with a binary surface pattern and a Fresnel optical surface pattern that each uses an aspheric surface as a base, both surfaces at two sides of the sixth lens are provided with optical spherical surfaces, and both surfaces at two sides of the seventh lens are provided with optical spherical surfaces;

third scheme:

in the direction from the human eye viewing side to the display device side, the surfaces at two sides of the fourth lens are respectively provided with an even aspheric surface and an optical spherical surface, the surfaces at two sides of the fifth lens are respectively provided with a binary surface pattern that uses an aspheric surface as a base and a Fresnel optical surface pattern that uses a spherical surface as a base, both surfaces at two sides of the sixth lens are provided with optical spherical surfaces, and both surfaces at two sides of the seventh lens are provided with optical spherical surfaces.

* * * * *